(No Model.)

O. A. ENHOLM.
ACID PROOF RETAINING VESSEL.

No. 438,312. Patented Oct. 14, 1890.

WITNESSES:

INVENTOR
Oscar A. Enholm
BY
J. F. Bourne
his ATTORNEY.

UNITED STATES PATENT OFFICE.

OSCAR A. ENHOLM, OF NEW YORK, N. Y., ASSIGNOR, BY DIRECT AND MESNE ASSIGNMENTS, TO THE ENHOLM ELECTRICAL CONSTRUCTION COMPANY, OF SAME PLACE.

ACID-PROOF RETAINING-VESSEL.

SPECIFICATION forming part of Letters Patent No. 438,312, dated October 14, 1890.

Application filed March 21, 1890. Serial No. 344,700. (No model.)

*To all whom it may concern:*

Be it known that I, OSCAR A. ENHOLM, a resident of the city, county, and State of New York, have invented certain new and useful Improvements in Cells or Retaining-Vessels, of which the following is a specification.

The object of my invention is to provide a light, strong, liquid-tight, and thoroughly acid-resisting vessel.

The invention consists in the novel details of improvement that will be more fully hereinafter set forth, and then pointed out in the claims.

Reference is to be had to the accompanying drawings, forming part of this specification, wherein—

Figure 1:
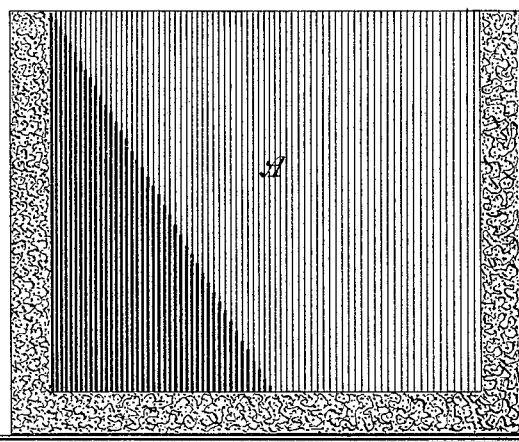
Figure 2:
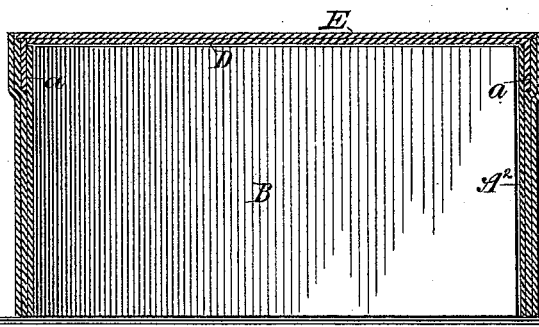
Figure 3:
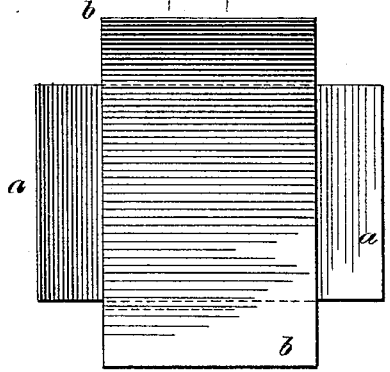
Figure 4:
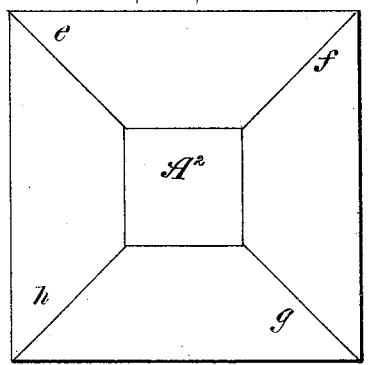

Figure 1 is a sectional view showing a vessel embodying my invention. Fig. 2 is a similar view of another vessel. Fig. 3 is a plan view of the parts forming the bottom of the vessel in Fig. 2, and Fig. 4 is a detail view showing a different manner of completing the vessel.

In carrying out my invention I mix asbestus (in fibers or woven cloth) with mineral wax, gutta-percha, and shellac, which forms a plastic material. A good proportion of parts I find to be about as follows: Asbestos fibers, forty parts; mineral wax, thirty parts; gutta-percha, thirty parts; shellac, ten parts; but the proportions may be varied as desired.

I prefer to first melt together the mineral wax, gutta-percha, and shellac, stir the mass to properly mix it, then add the asbestus, and then thoroughly mix all together while heated. The above mixture is then formed into the desired shape by pressing it in molds or otherwise while hot and then allowing it to cool, whereby the vessel A, (shown in Fig. 1,) or any other shape of vessel desired can be produced. I may, if desired, add to the mixture powdered glass, or I may apply the latter to the surface of the mixture before it hardens. The powdered glass gives a hard surface to the finished vessel.

Instead of combining loose asbestus fibers with the mixture of mineral wax, gutta-percha, and shellac, I may apply the above mixture to woven asbestus cloth $A^2$ by saturating or permeating said cloth with said mixture while it is in a heated state.

I may form the desired vessel with the cloth heated as above as follows: I take a suitable form or mold B and wind said saturated cloth $A^2$ around it, say, once. I next place a strip D, of suitable width, of the same cloth over the form B, so that its ends $a$ will lap over the layer $A^2$ of cloth. (See Fig. 2.) I then wind the cloth $A^2$ again around the form B, covering the ends $a$, as shown. I then place another strip E of said saturated cloth over the other strip D, only at about right angles thereto, so that its ends $b$ will lap over the last fold $A^2$. I then wind another layer $A^2$ around the form B and around the first layer to cover the ends $b$ of the strip E. These cross-strips D E form the bottom to the vessel, their sides coming against the edges of the layer $A^2$, and their ends are tightly inclosed by the folded parts. The winding of the layers may be kept up until the desired thickness is obtained. The above layers are all put together while the material is warm and plastic, and when it cools and hardens the parts will all adhere closely together, forming a water-tight vessel. The vessel may also be formed by cutting a piece of the woven asbestus cloth, treated as described, on the lines $e\ f\ g\ h$ and folding the parts together to form the vessel, the layers all adhering together when cold and forming a firm and water-tight vessel.

A vessel composed of my improved composition will be perfectly water-tight, will thoroughly withstand the action of chemicals, and will be extremely strong and rigid, the composition when hard being very tough.

Of course when the vessel is made of woven asbestus cloth, as described, the bottom can be attached in any other desired manner than that stated.

The fibers of the asbestus in connection with the other ingredients make the vessel extremely strong.

I can, if I desire, omit the shellac, or in place of shellac use rosin or another desired hardening gum or medium. The shellac or its equivalent acts to harden the mass when it is cold.

I make no claim in this application to the composition of matter herein described, as that is the subject of a separate application filed by me February 19, 1890, Serial No. 341,033.

Having now described my invention, what I claim is—

1. As a new article of manufacture, a cell or retaining-vessel composed of asbestus, mineral wax, gutta-percha, and a hardening medium, substantially as described.

2. As a new article of manufacture, a cell or retaining-vessel consisting of layers of asbestus cloth saturated or permeated with a solution of mineral wax, gutta-percha, and a hardening medium, substantially as described.

3. As a new article of manufacture, a cell or retaining-vessel composed of abestus, mineral wax, gutta-percha, and shellac, substantially as described.

In testimony that I claim the foregoing as my invention I have signed my name, in presence of two witnesses, this 20th day of March, 1890.

OSCAR A. ENHOLM.

Witnesses:
JULIUS M. HAYMAN,
T. F. BOURNE.